(12) United States Patent
Rachev et al.

(10) Patent No.: US 7,711,617 B2
(45) Date of Patent: May 4, 2010

(54) SYSTEM AND METHOD FOR PROVIDING OPTIMIZATION OF A FINANCIAL PORTFOLIO USING A PARAMETRIC LEPTOKURTIC DISTRIBUTION

(75) Inventors: Svetlozar Todorov Rachev, Santa Barbara, CA (US); Boryana Svetlozarova Racheva-Iotova, Sofia (BG); Stoyan Veselinov Stoyanov, Targovishte (BG); Richard Douglas Martin, Seattle, WA (US)

(73) Assignee: FinAnalytica, Inc., Seattle, WA (US)

( * ) Notice: Subject to any disclaimer, the term of this patent is extended or adjusted under 35 U.S.C. 154(b) by 1266 days.

(21) Appl. No.: 10/888,414

(22) Filed: Jul. 9, 2004

(65) Prior Publication Data
US 2005/0033679 A1 Feb. 10, 2005

Related U.S. Application Data

(60) Provisional application No. 60/486,345, filed on Jul. 11, 2003.

(51) Int. Cl.
*G06Q 40/00* (2006.01)
(52) U.S. Cl. .................... 705/35; 705/36 R; 705/37
(58) Field of Classification Search .............. 705/35–45
See application file for complete search history.

(56) References Cited

U.S. PATENT DOCUMENTS

| | | |
|---|---|---|
| 6,085,175 A | 7/2000 | Gugel et al. |
| 6,275,814 B1 | 8/2001 | Giansante et al. |
| 7,228,290 B2 * | 6/2007 | Browne et al. ............ 705/36 R |
| 2002/0019803 A1 * | 2/2002 | Muller ........................ 705/38 |
| 2003/0061152 A1 * | 3/2003 | De et al. ........................ 705/38 |
| 2004/0044505 A1 * | 3/2004 | Horwitz ........................ 703/3 |
| 2004/0186814 A1 * | 9/2004 | Chalermkraivuth et al. ... 706/16 |

OTHER PUBLICATIONS

Two Models of Heterokurticity and its Effect on Financial Rates of Return (Return Rates); Author: Dueker, Michael John; Year: 1991 Corporate Source/Institution: University of Washington (0250) Source: vol. 5208A of Dissertations Abstracts International. p. 3015. 54 Pages.*

Title: Stochastic Volatility and Transaction Time: An Activity-Based Volatility Estimator Author: Ane, Thierry; Geman, Helyette Author Affiliation: U Paris IX, Dauphine; ESSEC Business School Journal Name: Journal of Risk, Journal Volume & Issue: 2 1, pp. 57-69 Publication Date: 1999 Language: English; Availability: http://www.thejournalofrisk.*

(Continued)

*Primary Examiner*—Alexander Kalinowski
*Assistant Examiner*—Abhishek Vyas
(74) *Attorney, Agent, or Firm*—Patrick J.S. Inouye; Scott E. Smith

(57) ABSTRACT

A system and method for providing optimization of a financial portfolio using a parametric leptokurtic distribution is presented. One or more risk factors associated with a plurality of financial assets maintained in a portfolio and applicable over at least one time horizon are provided. A subordinated parametric distribution model having leptokurtic behaviors is specified for the risk factors with a measurement of risk expressed as a function of expected tail loss for a significance level or quantile. The subordinated distribution model is applied at each such time horizon to determine a distribution of the risk factors for the financial assets. Portfolio weights providing a substantially maximum risk adjusted return for the portfolio are determined.

22 Claims, 7 Drawing Sheets

OTHER PUBLICATIONS

Title: Optimal investment horizons Author(s): Simonsen, I.; Jensen, M.H.; Johansen, A. ; Author Affiliation: Nordic Inst. For Theor. Phys., Copenhagen , Denmark; Journal: European Physical Journal B, vol. 27 , No. 4 , pp. 583-586; Publisher: EDP Sciences; Springer-Verlag; Country of Publication: France Publication Date: Jun. 2002; ISSN: 1434-6028; SICI.*

H. Scheffe, "The Analysis of Variance," 1959, p. 332, Wiley & Sons, Inc., New York, USA.

H.M. Markowitz, "Portfolio Selection," Jour. of Finan., 1952, pp. 77-91, vol. 7, No. 1, USA.

R.T. Rockafellar et al., "Optimization of Conditional Value-At-Risk," Jour. of Risk, Spring 2000, pp. 21-41, vol. 2, No. 3, USA.

W.F. Sharpe, "The Sharpe Ratio," Jour. of Port. Mgt., Fall 1994, pp. 49-58, ABI/INFORM Global.

K.B. Leggio et al., "Comparing Alternative Investment Strategies Using Risk-Adjusted Performance Measures," FPA Journal, Jan. 2003, pp. 1-7, Article 11, http://www.fpanet.org/jounal/articles/2003_Issues/jfp0103-art11.cfm?renderforprint=1.

S. Farinelli et al., "Sharpe Thinking With Asymmetrical Preferences," Tech. Report, Univ. of Torino, 2003, pp. 1-16, University of Torino, Italy, Europe.

P. Artzner et al., "Coherent Measures of Risk," Math. Finan., Jul. 1999, pp. 203-228, vol. 9, Blackwell Publishers, Malden, MA, USA.

F.J. Fabozzi et al., "Investment Management," The Theory and Practice of Investment Management, 2002, pp. 3-14, Ch. 1, , Wiley & Sons, Inc., New York, NY, USA.

F.J. Fabozzi et al., "Portfolio Selection," The Theory and Practice of Investment Management, 2002, pp. 15-42, Ch. 2, Wiley & Sons, Inc., New York, NY, USA.

S. Rachev et al., "The Problem of Optimal Asset Allocation With Stable Distributed Returns," A Dekker Series of Lecture Notes in Pure and Applied Mathematics p. 295-361.

* cited by examiner

SYSTEM AND METHOD FOR PROVIDING OPTIMIZATION OF A FINANCIAL PORTFOLIO USING A PARAMETRIC LEPTOKURTIC DISTRIBUTION

CROSS-REFERENCE TO RELATED APPLICATION

This non-provisional patent application claims priority under 35 USC §119(e) to U.S. provisional patent application, Ser. No. 60/486,345, entitled "A System And Method For the Optimization and Performance Measurement of Financial Portfolios," filed Jul. 11, 2003, the disclosure of which is incorporated by reference.

FIELD OF THE INVENTION

The present invention relates in general to financial portfolio optimization and, specifically, to a system and method for providing optimization of a financial portfolio using a parametric leptokurtic distribution.

BACKGROUND OF THE INVENTION

An efficient financial portfolio provides the maximum risk adjusted return, which can be the greatest expected return for a given level of risk or the lowest risk for a given expected return. In general, risk can be measured symmetrically or asymmetrically. Symmetric risk measures include variance and standard deviation. Asymmetric risk measures include Value at Risk (VaR), which is a quantile of projected gains or losses over a target horizon, such as described in Jorion, P., "Value at Risk: the New Benchmark for Managing Financial Risk," p. 22, McGraw Hill (2d ed. 2001), the disclosure of which is incorporated by reference. Risk adjusted return is one specific type of risk measure for gauging portfolio efficiency. Risk adjusted return can be used by investors to compare the performance of portfolio managers and by portfolio managers to rank securities as potential investment candidates. Optimizing risk adjusted return can improve portfolio efficiency. Conventionally, risk factors, including vectors of financial asset returns, can be modeled using a Normal, or Gaussian, probability distribution either implicitly or explicitly during risk adjusted return optimization and measurement.

Although parametric Normal distributions allow for portfolio optimization over one or more time horizons, the returns for most financial asset classes and risk factors are leptokurtic and skewed and Normal distributions cannot account for such heavy tailed and asymmetric behavior. A probability distribution is considered leptokurtic if the distribution exhibits kurtosis, where the mass of the distribution is greater in the tails and is less in the center or body, when compared to a Normal distribution. A number of quantitative measures of kurtosis have been developed, such as described in Scheffe, "The Analysis of Variance," p. 332, Wiley & Sons, Inc., New York (1959), the disclosure of which is incorporated by reference. In addition, a probability distribution can be considered asymmetric if one side of the distribution is not a mirror image of the distribution, when the distribution is divided at the maximum value point or the mean.

An example of risk adjusted return optimization that implicitly uses parametric Normal distribution assumptions is mean-variance optimization, such as described in Markowitz, H. M., "Portfolio Selection," Jour. of Finan., Vol. 7, No. 1, pp. 77-91 (1952), the disclosure of which is incorporated by reference. Normal distributions fare poorly in risk adjusted return optimization for several reasons. For instance, Normal distribution "tails" fall off too quickly to account for leptokurtic behavior. As well, the returns of many financial assets exhibit skewed distributions. Moreover, the risk adjusted returns and risk factors for many types of financial assets remain leptokurtic and skewed even after removal of clustering of volatility effects through parametric Normal distributions. As a result, Normal distributions inaccurately measure risk adjusted returns and risk factors during financial portfolio optimization.

An alternative method for optimizing risk adjusted returns is described in Rockafellar, R. T. et al., "Optimization of Conditional Value-at-Risk," Jour. of Risk, Vol. 2, No. 3, pp. 21-41 (2000), the disclosure of which is incorporated by reference. Expected return is maximized as a Linear Programming (LP) problem using expected tail loss (ETL), also known as conditional value at risk (cVaR) or expected shortfall, as a measure of risk for the risk factors. Although ETL is an asymmetric measure of risk that measures only down side risk, that is, the risk of loss, ETL differs from variance by only a constant and is modeled as a symmetric measure under a Normal distribution. As well, ETL can be determined using an historical method, which attempts to estimate an empirical distribution for the returns and risk factors. However, empirical distributions can only model actual historical events and are inherently limited by the historical record.

The Sharpe ratio, such as described in Sharpe, W. F., "The Sharpe Ratio," Jour. of Port. Mgt., pp. 49-58 (Fall 1994), the disclosure of which is incorporated by reference, is a classic example of risk adjusted return. The Sharpe ratio can be expressed as the univariate equation:

$$\rho = \frac{E(r - r_f)}{STD(r - r_f)}$$

for the asset r, where $r_f$ is a return of a risk-free asset f, and STD is the standard deviation. The Sharpe ratio assumes that risk can be measured by a standard deviation of the returns relative to the risk free rate.

An alternative ratio that accounts for the asymmetric behavior of financial asset returns is the Sortino-Stachel ratio, such as described in Sortino, F. A., "Upside-Potential Ratios Vary by Investment Style," Pensions and Invests., Vol. 28, pp. 30-35 (2000), the disclosure of which is incorporated by reference. The Sortino-Stachel ratio attempts to use a measure of down side risk, but fails to address leptokurtic behavior.

As alternative ratio that accounts for the leptokurtic behavior of financial asset returns is the stable ratio, such as described in Ortobelli, S. L. et al., "The Problem of Optimal Portfolio with Stable Distributed Returns," Working Paper, UCLA (2003), the disclose of which is incorporated by reference. The stable ratio assumes that excess return, $(r-r_f)$, is a stable non-Gaussian distribution. Although addressing leptokurtic behavior, the stable ratio fails to address asymmetric behavior. Further, this ratio uses only an empirical measure of risk, rather than an actual measure of the probability of loss or tail risk, as could be achieved with a parametric distribution, diminishing the potential accuracy.

An alternative ratio that accounts for both leptokurtic and asymmetric behavior is the Farinelli-Tibiletti ratio, such as described in Farinelli, S. et al., "Sharpe Thinking With Asymmetrical Preferences," Tech. Report, Univ. of Torino (2003), the disclosure of which is incorporated by reference. The Farinelli-Tibiletti ratio uses asymmetric measures of "up-side" and "down-side,". This ratio uses only an empirical measure of risk, rather than an actual measure of the probability of loss or tail risk, as could be achieved with a parametric distribution, diminishing the potential accuracy.

Therefore, there is a need for an approach to determining an optimization of risk adjusted return of financial assets and portfolios that accounts for leptokurtic and asymmetric effects independent of the limitations of Normal or empirical distributions.

SUMMARY OF THE INVENTION

The present system and method automatically determines risk measures of financial assets and financial portfolios and optimizes risk-adjusted returns of financial portfolios, while avoiding the common assumption in which returns are modeled using a Normal probability or empirical distribution. Parametric distributions are used to model both leptokurtic and asymmetry effects in financial returns and risk factors for the optimization of portfolios of financial assets. In addition, ETLs are measured from these distribution models. These parametric distributions allow for the modeling of multivariate effects, such as the dependency between the returns or risk factors, while accounting for the "heavy tails" of leptokurtic and asymmetric returns distributions. Further, the use of parametric distributions allows the use of various methods to model the clustering of volatility effect to more accurately determine ETLs.

In one embodiment, the system and method uses an ETL determined from parametric leptokurtic distributions to optimize the risk adjusted return of a given portfolio using well known LP methods. As required, constraints are used in the formulation of the LP problem. Risk or return estimates form one set of constraints and additional constraints can be specified to restrict the feasible set of portfolio weights to achieve desirable portfolio properties. Transaction cost functions and liquidity risk, or "market friction," functions are added to the estimates of returns or the constraints as penalty terms in the LP problem, as required, which allow the model to account for real-world penalties that restrict a portfolio manager's trading strategies. Using the ETL as the risk measure for portfolio optimization has several advantages. ETL is an asymmetric measure of "down side" risk, that is, the risk of a loss, and is more realistic than traditional symmetric measures of risk, such as volatility. Moreover, using ETL as the risk constraint allows the optimization to be formulated as an LP problem, thereby allowing the use of well known and stable computational methods for large scale portfolios. Finally, using parametric distributions that allow for leptokurtic and asymmetric behavior allows for the determination of more accurate estimates of portfolio risk producing optimized portfolios with better risk adjusted returns.

In addition, ETL is used as the measure of risk to model both leptokurtic and asymmetry effects in financial returns in the determination of risk adjusted return measures. ETL has several advantages as a measure of risk when compared to other risk measures. For example, ETL meets the requirements for a risk measure, such as described in Artzner, P. et al., "Coherent Measures of Risk," *Math. Finan.*, Vol. 9, pp. 203-228 (1999), the disclosure of which is incorporated by reference, including coherence, subadditivity, convexity, linearizability, positivity, positively homogeneous, and translation invariance.

An embodiment provides a system and method for providing optimization of a financial portfolio using a parametric leptokurtic distribution. One or more risk factors associated with a plurality of financial assets maintained in a portfolio and applicable over at least one time horizon are provided. A subordinated parametric distribution model having leptokurtic behaviors is specified for the risk factors with a measurement of risk expressed as a function of expected tail loss for a significance level or quantile. The subordinated distribution model is applied at each such time horizon to determine a distribution of the risk factors for the financial assets. Portfolio weights providing a substantially maximum risk adjusted return for the portfolio are determined.

In a further embodiment, an asymmetric measure of "up-side" risk, rather than the usual mean return or expected return, is used for the measurement of risk adjusted return.

In a further embodiment, the results are produced in terms of asset allocation weights for the portfolio. In still further embodiments, the results are reported in terms of determined risk adjusted returns for one or more financial assets or one or more portfolios of financial assets.

In a further embodiment, single-period portfolio optimization is determined using ETL constraints. In a still further embodiment, multi-period or multiple time step optimization is performed using ETL constraints. In a still further embodiment, the ETL constrains are determined from univariate subordinated distribution models for returns or risk factors, while in a still further embodiment, the ETL constraints are determined using multivariate subordinated probability model scenario generation for returns or risk factors.

In a further embodiment, a portfolio with a flat structure is optimized, where all assets, regardless of type, are in the same portfolio. In a further embodiment, hierarchical portfolio structures can be created and optimized.

In a further embodiment, one or more constraints on the feasible set of asset allocation weight solutions are used.

In a further embodiment, additional penalty terms in the optimization problem are allowed.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Overview

Figure 1:
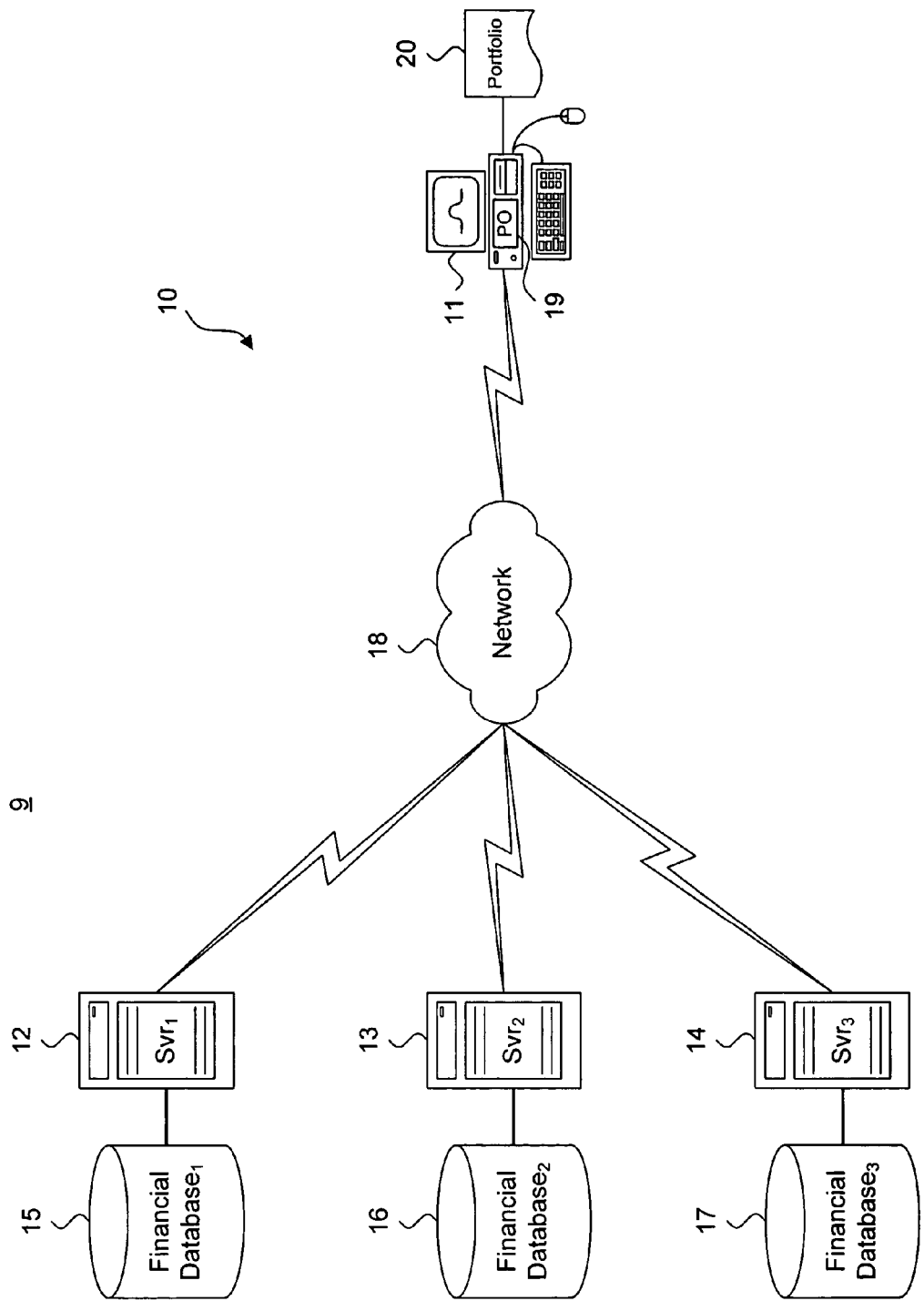
FIG. 1 is a functional block diagram showing a system for providing optimization of a financial portfolio using a parametric leptokurtic distribution, in accordance with an embodiment of the invention.

FIG. 1 is a functional block diagram 9 showing a system 10 for providing optimization of a financial portfolio 20 using a parametric leptokurtic distribution, in accordance with an embodiment of the invention. A workstation 11 is interoperatively interfaced to a plurality of servers 12-14 over a network 18, which can include an internetwork, such as the Internet, intranetwork, or combination of networking segments. In a further embodiment, the workstation 11 operates as a standalone determiner system without interfacing directly to other determiner systems, although data can still be exchanged indirectly through file transfer over removable media. Other network domain topologies, organizations and arrangements are possible.

The workstation 11 includes a portfolio optimizer (PO) 19 that determines an optimal set of risk adjusted return for a portfolio of financial assets 20, as further described below beginning with reference to FIG. 2. The servers 12-14 each maintain a database 15-17 containing financial data, such as historical record of securities and risk factors for securities, that can optionally be retrieved by the workstation 11 during portfolio optimization. The portfolio 20 can include one or more financial assets, including securities and other forms of valuated properties, such as described in Fabozzi, F. J., "The Theory & Practice of Investment Management," Chs. 1-2, pp. 3-42, Wiley & Sons, Inc., New York (2002), the disclosure of which is incorporated by reference. In one embodiment, a portfolio 20 with a flat structure is optimized, where all assets, regardless of type, are in the same portfolio. In a further embodiment, each portfolio 20 can be composed of any number of subportfolios, which can also be composed of subportfolios to any depth of hierarchy. A subportfolio can be used, for instance, to contain any set of financial assets 26 convenient to the user or portfolio manager. In some cases, a user or portfolio manager may decide to create subportfolios which segregate the overall portfolio 26 by asset type or class. With a hierarchical portfolio, the optimization can be done within each subportfolio and across the collections of portfolios at any level in the hierarchy. Moreover, the time horizon of the optimization can be different for each level of portfolio and subportfolio.

The individual determiner systems, including the workstation 11 and servers 12-14, are general purpose, programmed digital determining devices consisting of a central processing unit (CPU), random access memory (RAM), non-volatile secondary storage, such as a hard drive or CD ROM drive, network interfaces, and can include peripheral devices, such as user interfacing means, such as a keyboard and display. Program code, including software programs, and data are loaded into the RAM for execution and processing by the CPU and results are generated for display, output, transmittal, or storage.

System Overview

Figure 2:
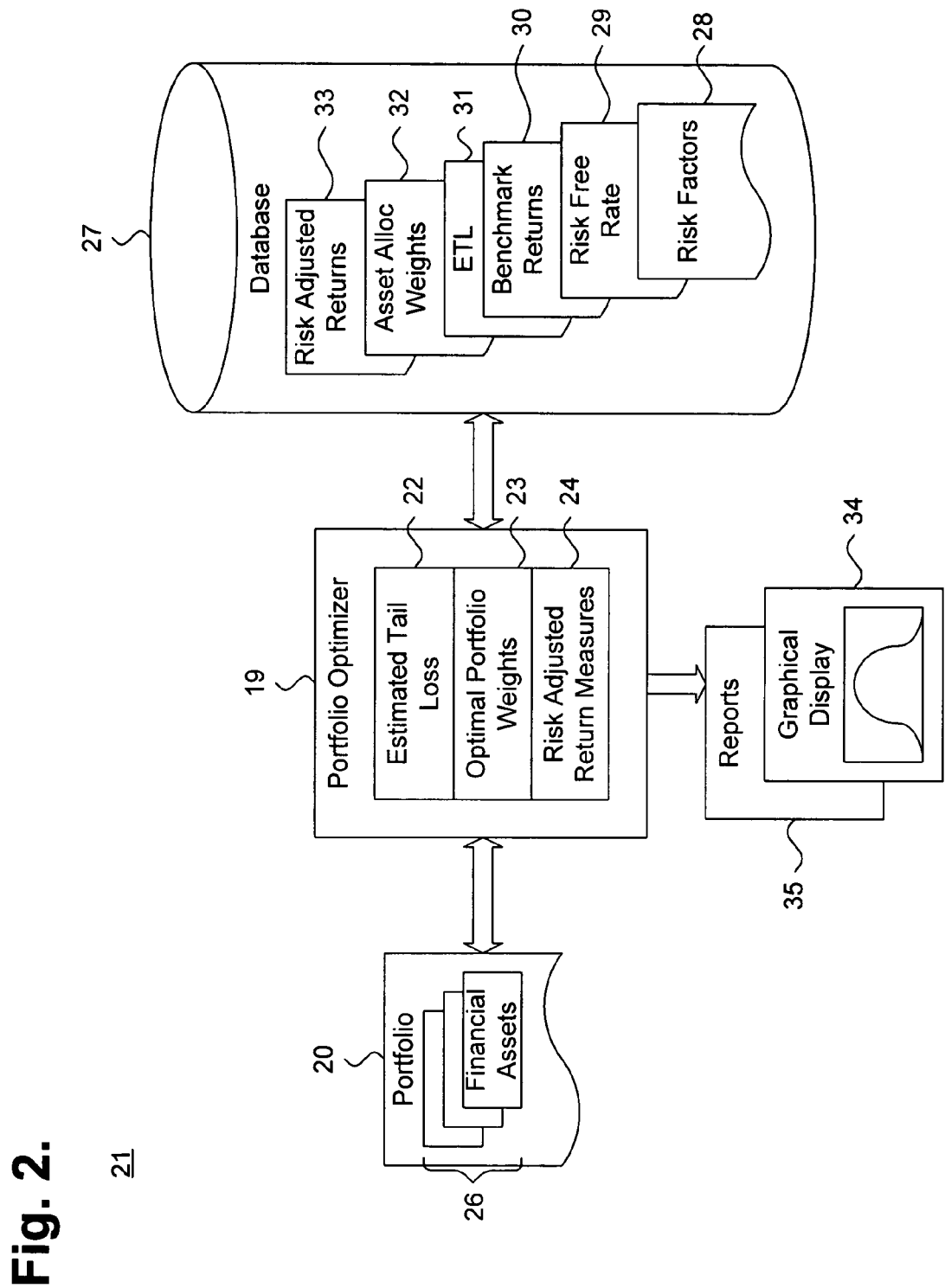
FIG. 2 is a block diagram showing a portfolio optimizer for use in the system of FIG. 1.

FIG. 2 is a block diagram 21 showing a portfolio optimizer 19 for use in the system 10 of FIG. 1. The portfolio optimizer 19 optimizes risk adjusted return for the portfolio 20 of financial assets 20 26 and includes components for determining expected tail loss (ETL) 22 and optimal portfolio weights 23. In a further embodiment, the portfolio optimizer 19 also includes a component to determine risk adjusted return measures 24. The portfolio optimizer 19 maintains a database 27 in which risk factors 28, risk free rates 29, benchmark returns 30, ETL 31, asset allocation weights 32, and risk adjusted returns 33 are stored. As outputs for use by a user or portfolio manager, the portfolio optimizer 19 can generate graphical displays 34, such as an efficient frontier graph, and reports, such as a tabular report of optimized risk adjusted return 33. Other forms of output are possible.

The expected tail loss determining component 22 determines ETL 31 as a measure of risk for use in the determination of the risk adjusted return 33 using a subordinated model for parametric distributions, as further described below with reference to FIG. 3. Determining ETL with subordinated models can have advantages resulting in higher accuracy than other forms of risk measures, such as described in Artzner, P. et al., "Coherent Measures of Risk," *Math. Finan.*, Vol. 9, pp. 203-228 (1999), the disclosure of which is incorporated by reference. In one embodiment, risk adjusted returns 33 are determined using average returns or expected returns as the measure of "up-side" risk. In a further embodiment, a measure of return above a predetermined quantile as an up-side analogue of ETL is determined. In addition, risk adjusted returns 33 can be measured over one or more time horizons, generally at the discretion of the user or portfolio manager. Risk adjusted return can apply to any risk factor and is not limited to price returns.

The optimal portfolio weights determining component 23 determines risk constraints for the portfolio 20 for one or more sets of asset allocation weights 32, as further described below with reference to FIG. 4. The ETL 31 determined by the expected tail loss determining component 22 is combined with estimates of expected return, which is formulated into a linear programming (LP) problem. The optimal portfolio weights determining component 23 solves the LP problem to determine the asset allocation weights 332, which optimize the expected risk adjusted return 33 of the portfolio 20. For ease of presentation, single time-step optimizations for a single portfolio with a flat structure are described, although multi-time-step optimization or optimization of hierarchically structured portfolios can also be performed by extension.

In one embodiment, constraints can be imposed for each level of a hierarchically organized portfolio 26. By imposing constraints, the user or portfolio manager can achieve certain desired behaviors or properties for the optimized portfolios 26. For example, asset allocation weights 32 can be positive or negative. In one embodiment, asset allocation weights 32 are limited to values of zero or greater, such as for long only portfolios. In a further embodiment, the weights can be positive, zero or negative, such as for long short portfolios.

In one embodiment, the risk adjusted returns 33 are determined by applying at least two types of common portfolio optimization formulations that are a primal-dual formulation of the same optimization problem. Both formulations are posed as LP problems and the set of feasible solutions for the one formulation is the same as for the other problem. The following definition of a primal-dual formulation is used here, although no particular significance is placed on the choice of the primal versus dual formulation and the two formulations can be used interchangeably.

Primal

In one type of optimization problem, a user or portfolio manager wishes to maximize expected portfolio return, provided that portfolio risk does not exceed a predefined level. In this case, the optimization problem can be formulated as follows:

$$\max_{x \in X} \rightarrow \sum_{i=1}^{n} x_i E q_i - V_0$$

such that ETL(x, ε)≦R, where the set x includes some feasible strategies, $Eq_i$ is the expected log-price of the i-th portfolio item, ETL(x, ε) is the risk of the strategy x and R is the risk constraint value.

Dual

In a second type of optimization problem, a user or portfolio manager wishes to minimize risk, provided that expected portfolio return does not fall below a certain level. This problem can be formulated as follows:

$$\min_{x \in X} \to ETL(x, \varepsilon)$$

such that $$\sum_{i=1}^{n} x_i Eq_i - V_0 \geq \rho,$$

where the set x includes some feasible strategies, $Eq_i$ is the expected log-price of the i-th portfolio item, ETL(x, ε) is the risk of the strategy x and ρ is the return constraint value.

By repeatedly solving either the primal or dual formulation, values of optimal risk and return along an efficient frontier can be determined across the feasible set of asset allocation weights 32. In one embodiment, automatic determination and graphical display of the points on the efficient frontier are provided to allow the user or portfolio manager to better understand the risk-return tradeoff for the portfolio. In a further embodiment, determinational procedures are provided to find a point along the efficient frontier with the greatest risk adjusted return.

Finally, in a further embodiment, the risk adjusted return measures component 24 determines and reports risk adjusted return 33 using the ETL 31 as a measure of risk over one or more time horizon for one or more risk factors 28, as further described below with reference to FIG. 5. The risk adjusted return 33 can be reported in tabular or graphical format for one or more financial assets 26 or one or more portfolios 20 or subportfolios. The financial assets 26 or portfolios 20 and subportfolios can also be sorted or ranked by risk adjusted return 33. As well, the risk adjusted returns 33 for multiple risk factors can also be determined and reported.

Subordinated models for parametric distributions will now be discussed in more detail.

Subordinated Models for Parametric Distributions

In general, financial assets 26 and portfolios 20 can be optimized using subordinated models to determine values for the probability distributions of financial returns of risk factors 28, such as described in Grinold, R. et al., "Active Portfolio Management: a Quantitative Approach for Providing Superior Returns and Controlling the Risk," McGraw-Hill (1999) and Campbell, J. et al., "The Econometrics of Financial Markets," Princeton Univ. Press, (1997), the disclosures of which are incorporated by reference. The risk factors 28 can be market price returns of individual financial assets or securities or of a portfolio of financial assets. In other cases, the risk factors 28 can be derived as determined values, such as from fundamental securities information, or can be exogenous factors, such as interest rates or other macroeconomic factors, which may affect the price of a security. In the discussion here, few, if any, restrictions are placed on the nature of the risk factors 28 used and the term return can refer to the relative change in any such risk factor 28 over some time horizon or time period.

The accurate modeling of financial returns, including risk adjusted returns 33, and risk factors 28 requires the use of probability distributions that account for leptokurtic and asymmetric behavior. In one embodiment, suitable probability distributions non-exclusively include the alpha-Stable distribution, T-distribution, sub-Gaussian Stable distribution, and mixtures of multivariate Normal distributions. Other forms of parametric distributions that account for leptokurtic and asymmetric behavior could also be used. These probability distributions can be used by the expected tail loss determining component 22 to accurately determine the ETL 31. In a further embodiment, subordinated models that allow determinations of probabilities within a systematic framework are used, which can be viewed as finite or infinite mixtures of multivariate Gaussian models. Such subordinated models can be applied to the commonly-used families of leptokurtic and asymmetric probability distributions.

A static, that is, one period, for example, one day, distribution of a subordinated model consists of finite or infinite mixtures of normal multivariate distributions and can be described by a random mean vector and random covariance matrix. Therefore, assuming independent one-period financial returns, the one-period distribution defines the probabilistic law of the entire return process. To generalize this simple model by adding clustering of the volatility, consider the following model for multivariate financial returns, namely, the multivariate financial returns time series modeled by multivariate exponential weighted moving average or, more generally, with multivariate ARMA-GARCH time series with innovations having multivariate subordinated distributions.

The multivariate ARMA-GARCH time series model with subordinated residuals, that is, innovations, can be used to generate future scenarios for the vector of financial returns for several time periods ahead. In one embodiment, the following Monte Carlo procedure is used to generate these scenarios:

(1) generate the multivariate Gaussian distribution embedded in the subordinated model;

(2) generate the multivariate distribution of the subordinators, that is, the random volatilities; and (3) multiply every Gaussian random variable with the variable's subordinator.

In one embodiment, single-period portfolio optimization is determined using ETL constraints. In a further embodiment, multi-period or multiple time step optimization is performed using ETL constraints, which can be determined using either single or multi-step scenario generation, such as Monte Carlo simulations, where the realizations of the probability values are determined using subordinated models. In a still further embodiment, the ETL constrains are determined from univariate subordinated distribution models for returns or risk factors, while in a still further embodiment, the ETL constraints are determined using multivariate subordinated probability model scenario generation for returns or risk factors. Various models for clustering of volatility in the calculation of the ETL constraints can be employed.

An alternative representation in continuous time model can be based on jump diffusion processes with embedded subordinating process, which can be viewed as a "time change" process, also referred to as market timing. The continuous time analogue can be used in very small dimensions, generally with a maximum of three dimensions, and the main application of the analogue is in option pricing with subordinated models. Practical limitation on dimensionality can limit the usefulness of this model for the determination of multivariate VaR and ETL.

The result of the foregoing procedures is a vector of scenarios for the subordinated residuals. Using the estimated parameters for the ARMA-GARCH process, scenarios are generated for the return or risk factor process driven by the ARMA-GARCH time series with subordinated residuals. The risk characteristics of a given portfolio, such as VAR and ETL, can then be determined by having generated the scenarios for the subordinated process of financial returns or risk factors.

In the following discussion, the generic form of a multivariate subordinated random vector is given by the following expression:

$$X = (X_1, \ldots, X_n)$$

where $X_i = Y_i * Z_i$. The vector $Z = (Z_1, \ldots, Z_n)$ has a multivariate Gaussian distribution with zero mean and covariance matrix $\Sigma$. The vector $Y = (Y_1, \ldots, Y_n)$ with positive components representing the "random volatilities" can have an arbitrary distribution. In one embodiment, the subordinated models are used to determine probabilities for commonly used leptokurtic and asymmetric distributions, which include, by way of example, the alpha-Stable distribution, T-distribution, sub-Gaussian Stable distribution, and mixtures of multivariate Normal distributions.

Alpha-Stable Subordinated Model

If random volatilities, $Y_i$, are $\alpha_i/2$-stable subordinators, that is, where $\alpha_i/2$ are strictly positive random variables, then the vector of random variables, X, consisting of dependent random variables, each of which has its own index of stability, $X_i$, will be a symmetric $\alpha_i$-stable random variable. To extend this model to allow the vector X to have a possibly asymmetric distribution, consider the following: let $X_i$ have an arbitrary $\alpha_i$-stable distribution with zero mean, with $$X_i^d = S_{\alpha_i}(\gamma_i, \beta_i, 0),$$

where $\gamma_i$ is the scale parameter and $\beta_i$ is the skewness or asymmetry parameter. The expression $$X_i^d = S_{\alpha_i}(\gamma_i, \beta_i, 0)$$

can then be modeled as a sum of two independent stable random variables, that is:

$$X_i^d = X_i^{(1)} + X_i^{(2)}$$

where $X_i^{(1)d} = S_{\alpha_i}\left((k^{\alpha_i}+1)^{\frac{1}{\alpha_i}}\gamma_i, 0, 0\right)$ and $$X_i^{(2)d} = S_{\alpha_i}\left(k(k^{\alpha_i}+1)^{\frac{1}{\alpha_i}}\gamma_i, (1+k^{-\alpha_i})\beta_i, 0\right)$$

for some k>0 belonging to the interval $$\left[\max_{1 \leq i \leq n}\left(\frac{|\beta_i|}{1-|\beta_i|}\right)^{\frac{1}{\alpha_i}}, +\infty\right).$$

The first random variable $X_i^{(1)}$ can be represented as $X_i^{(1)} = Y_i^{(1)} * Z_i^{(1)}$ since the distribution is symmetric stable. The second random variables add the necessary skewness to the random variable $X_i$.

T-Distribution Subordinated Model

A typical multivariate, that is elliptical, distribution with null mean and finite variance is the multivariate Student's T-distribution with v>2 degrees of freedom, MV-t$(0,\Sigma_v)$. These distributions are frequently used to justify the leptokurtic behavior of conditional returns. The T-multivariate distribution for the vector $X = (X_1, \ldots, X_n)$ admits the following density function:

$$t(x/\sigma_i, v) = \frac{\Gamma\left(\frac{v+1}{2}\right)}{\sigma_i((v-2)\pi)^{1/2}\Gamma\left(\frac{v}{2}\right)}\left(1 + \frac{x^2}{\sigma_i^2(v-2)}\right)^{-\frac{v+1}{2}}$$

If there are $v \leq 2$ degrees of freedom, the multivariate T-distribution lacks a covariance matrix, but is nonetheless elliptical, meaning that the random vector X can be represented in the form:

$$X^d = \mu + \frac{Z}{\sqrt{X_v^2}}$$

where $\mu$ is constant vector, Z is a mean zero normal vector with a given covariance matrix, and $X_v^2$ is a Chi-squared random variable with v-degrees of freedom. Moreover, with $v \leq 2$ degrees of freedom, the vector X also lacks variances and its distribution can be used to model heavy-tailed distributed financial returns with infinite variance. Finally, with v>1 degrees of freedom, the vector $\mu$ represents the mean vector of X. In one embodiment, asymmetric T-distributions apply and allow the model to account for both leptokurtic and asymmetric behavior in the risk factors 28.

Sub-Gaussian Stable Model

Another elliptical distribution is the sub-Gaussian distribution, which is a special but important case of the multivariate stable distribution described above. In fact, $X = (X_1, \ldots, X_n)$ is an a-stable sub-Gaussian distribution, where $\alpha > 1$, with a characteristic function:

$$\Phi_X(U) = E(e^{iu'X}) = \exp(-(u'Qu)^{\alpha/2} + iu'\mu)$$

where $Q = \lfloor \sigma_{ij}^2 \rfloor$ is the "dispersion" matrix, and $\mu_i = E(z_i)$.

This model represents an elliptical model with infinite variance. In particular, for any ij=1, . . . ,n, the elements of the dispersion matrix can be defined as:

$$\sigma_{ij}^2 = (A(\alpha, p))_p^2 f(p, \tilde{X}_i, \tilde{X}_j) \text{ where}$$

$$\tilde{X}_i = X_i - \mu_i, A(\alpha, p) = \frac{\Gamma\left(1 - \frac{p}{2}\right)\sqrt{\pi}}{2^p \Gamma\left(1 - \frac{p}{\alpha}\right)\Gamma\left(\frac{p+1}{2}\right)},$$

$$\tilde{X}_j^{\langle p-1 \rangle} = \text{sgn}(\tilde{X}_j)|\tilde{X}_j|^{p-1}, \text{ and}$$

$$f(p, \tilde{X}_i, \tilde{X}_j) = E(\tilde{X}_i(\tilde{X}_j)^{\langle p-1 \rangle})(E(|\tilde{X}_j|^p))^{\frac{2-p}{p}}.$$

Multivariate Clustering of Volatility Models

A multivariate ARMA-GARCH-time series with innovations having multivariate subordinated distribution has the following form, where every component of the time-series admits the representation:

$$Y_t = c_o + \sum_{i=1}^{n} a_i Y_{t-i} + \sum_{j=1}^{m} b_j \sigma_{t-j} \varepsilon_{t-j} + \sigma_t \varepsilon_t \quad (1)$$

$$\sigma_t^2 = \alpha_o + \sum_{k=1}^{q} \alpha_k \sigma_{t-k}^2 \varepsilon_{t-k}^2 + \sum_{k=1}^{p} \beta_k \sigma_{t-k}^2 \quad (2)$$

Equation (1) represents the ARMA(n,m) model, while equation (2) gives the "clustering of the volatility" expressed by the GARCH(p,q) model. To add an exogenous time-series component, often representing factor time series, which includes market returns and Fama-French three factor models, equation (1) can be extended as follows:

$$Y_t = c_0 + \sum_{k=1}^{d} c_k X_t^{(k)} + \sum_{i=1}^{n} a_i Y_{t-i} + \sum_{j=1}^{m} b_j \sigma_{t-j} \varepsilon_{t-j} + \sigma_t \varepsilon_t \quad (3)$$

where equation (2) remains unchanged.

Expected Tail Loss

Figure 3:
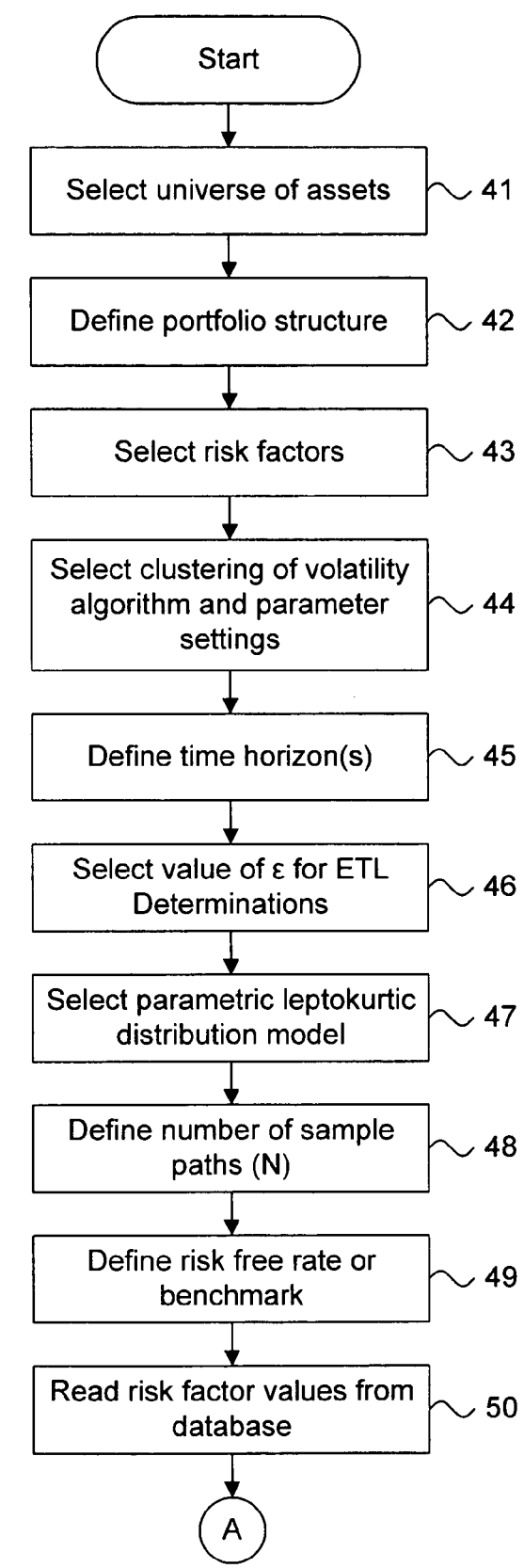
FIG. 3 is a flow diagram showing a method for determining expected tail loss.
Figure 3:
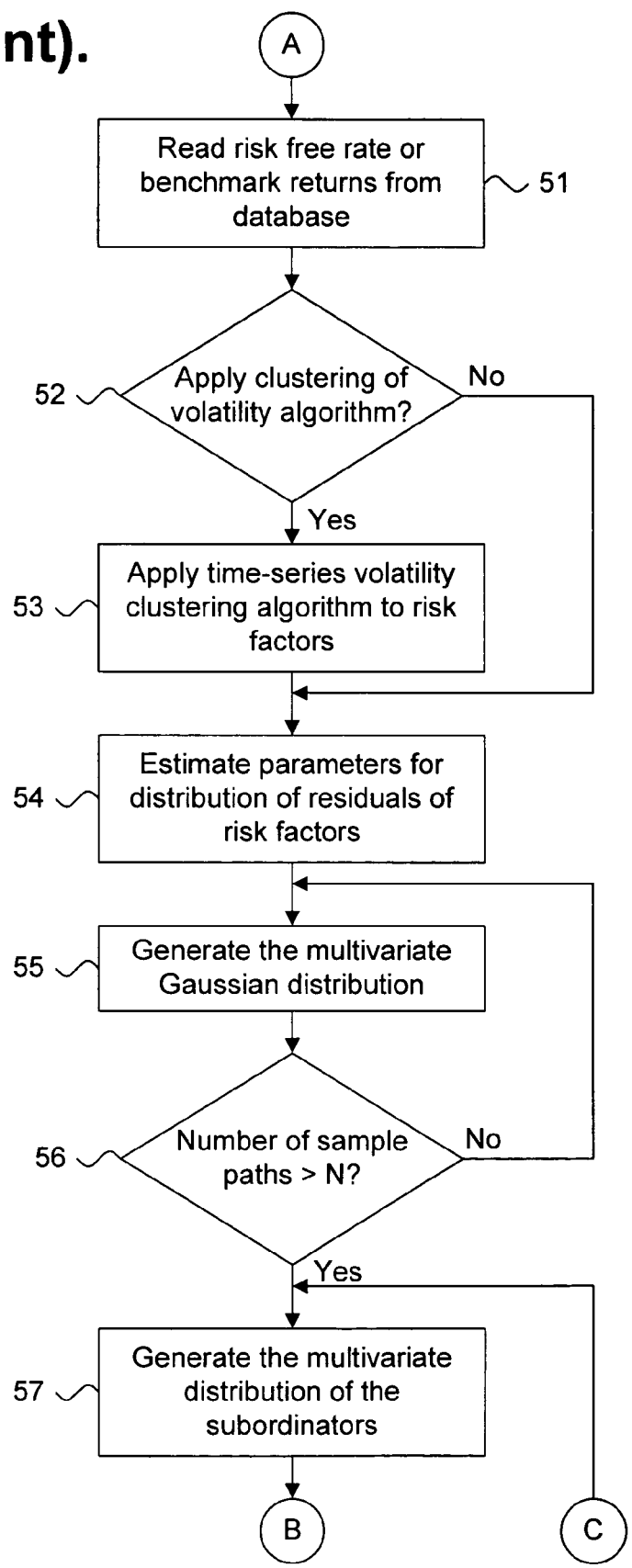
Figure 3:
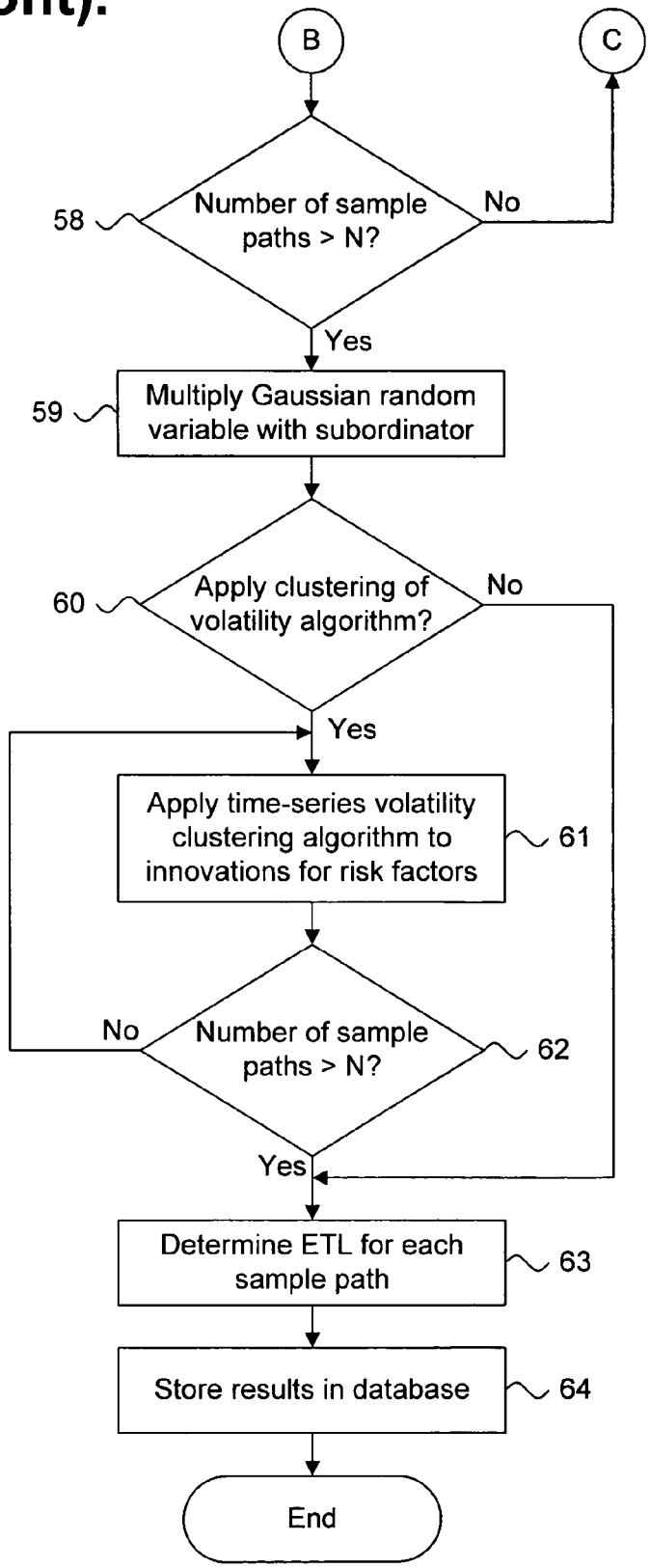

FIG. 3 is a flow diagram showing a method 40 for determining ETL 31. Estimated or expected returns can be determined relative to a risk free rate of return. In addition, both risk and return can be measured in absolute or relative terms. Finally, one or more risk factors 38 can be applied for one or more financial assets 26 or one or more portfolios 20 or subportfolios. The method 40 is described as a sequence of process operations or steps, which can be executed, for instance, by the portfolio optimizer 19.

Initially, the universe of financial assets 26 for the portfolio 20 or subportfolio to be analyzed is selected (block 41). The structure of the portfolio 20, which can be flat or hierarchical, is defined (block 42) and the risk factors 28 to be used in the determination are selected from the database 27 (block 43). Next, the clustering of volatility algorithm to be used is selected (block 44), or, in a further embodiment, no clustering of volatility algorithm is applied. The time horizon or time horizons for the determination are defined (block 45), as well as the value of epsilon (□), that is, the significance level or quantile, to be used in the determination of the ETL 31 (block 46). The model with any required parameters are selected (block 47), which, in one embodiment, includes a parametric leptokurtic, and possibly asymmetric, distribution model for the computation. The number of sample paths used for the Monte Carlo algorithm to compute the values of the subordinated distribution is defined (block 48) and the risk free rate or benchmark portfolio, if any, to be used is also defined (block 49).

Next, the risk factor values and the risk free rate 29 or benchmark returns 30 are respectively read from the database 27 (blocks 50 and 51). If neither a risk free rate 29 nor benchmark returns 30 are to be used, a vector of zeros is substituted. If a clustering of volatility algorithm is to be used (block 52), the selected algorithm is applied to the time series of risk factor returns (block 53) and the results are a time series of normalized residuals or innovations for the risk factors 28. The parameters of the distribution of the returns or residuals are estimated (block 54) and the realizations of the multivariate Gaussian distribution are generated (block 55), until the required number of sample paths N has been generated (block 56). The realizations of the multivariate distribution of subordinators, that is, the random volatility, are also generated (block 57) until the required number of sample paths N has been generated (block 58). The subordinated model distribution for each sample path is then determined by multiplying the Gaussian random variable by its subordinator (block 59).

If a clustering of volatility algorithm is being applied (block 60), the clustering of volatility algorithm is applied to scale the innovations (block 61), until the required number of sample paths N has been generated (block 62). Finally, the distribution of the risk factors 28 determined for the ETL 31 for each sample path is determined (block 63) and stored in the database 27 (block 64). The method then terminates.

In one embodiment, ETL 31 of a financial asset 26 or portfolio 20 serves as the measure of risk, which is defined as the expected portfolio loss provided that the loss is higher than the Value-at-Risk (VaR) figure determined at a given significance level, such that:

$$ETL(\varepsilon) = E(L_x | L_x > VaR(\varepsilon))$$

where $L_x$ denotes portfolio loss and $\varepsilon$ is the significance level or quantile, that is, $Pr(L_x > VaR(\varepsilon)) = \varepsilon$. In turn, portfolio loss is defined as negative portfolio return over one period and can be determined as:

$$L_x = q^T x + p^T x$$

where $p = (p_1, p_2, \ldots, p_n)$ is an n-dimensional vector of the current log-prices of the portfolio items, that is, prices of single units, such as one share, one gold contract, and so forth, $q = (q_1, q_2, \ldots, q_n)$ is the random vector of the future log-prices of all portfolio items one period ahead, and $x = (x_1, x_2, \ldots, X_n)$ represents the portfolio structure as a vector of asset allocation weights. Thus, $p^T X = V_0$ represents the present portfolio log-value.

Bearing in mind the particular choice of a loss function, the conditional expectation in the definition of the ETL can be expressed as:

$$ETL(x, \varepsilon) = \frac{1}{\varepsilon} \int_{VaR(x,\varepsilon)}^{\infty} (-z^T x + V_0) f_q(z) dz$$

where $f_q(z)$ is the probability density function of the random vector $q = (q_1, q_2, \ldots, q_n)$. In one embodiment, this probability density function is leptokurtic or heavy tailed and can be asymmetric. In further embodiments, values of the probability density function are determined using suitable subordinated models. The value of the ETL 31 can be determined using one of several suitable numerical methods for evaluating asymptotic integrals. In one embodiment, the distribution can be univariate, while in further embodiments, the distribution can be multivariate. Models can also be used to account for the clustering of volatility.

Measures of "up-side" risk can be determined readily using the same framework as used to determine the ETL 31. In one embodiment, a measure of return above a selected upper quantile, as opposed to the lower quantile used to determine the ETL 31, can be used in the determination of risk adjusted return 33, rather than more traditional measures of average return or expected return.

Risk Adjusted Return Optimization with ETL

Figure 4:
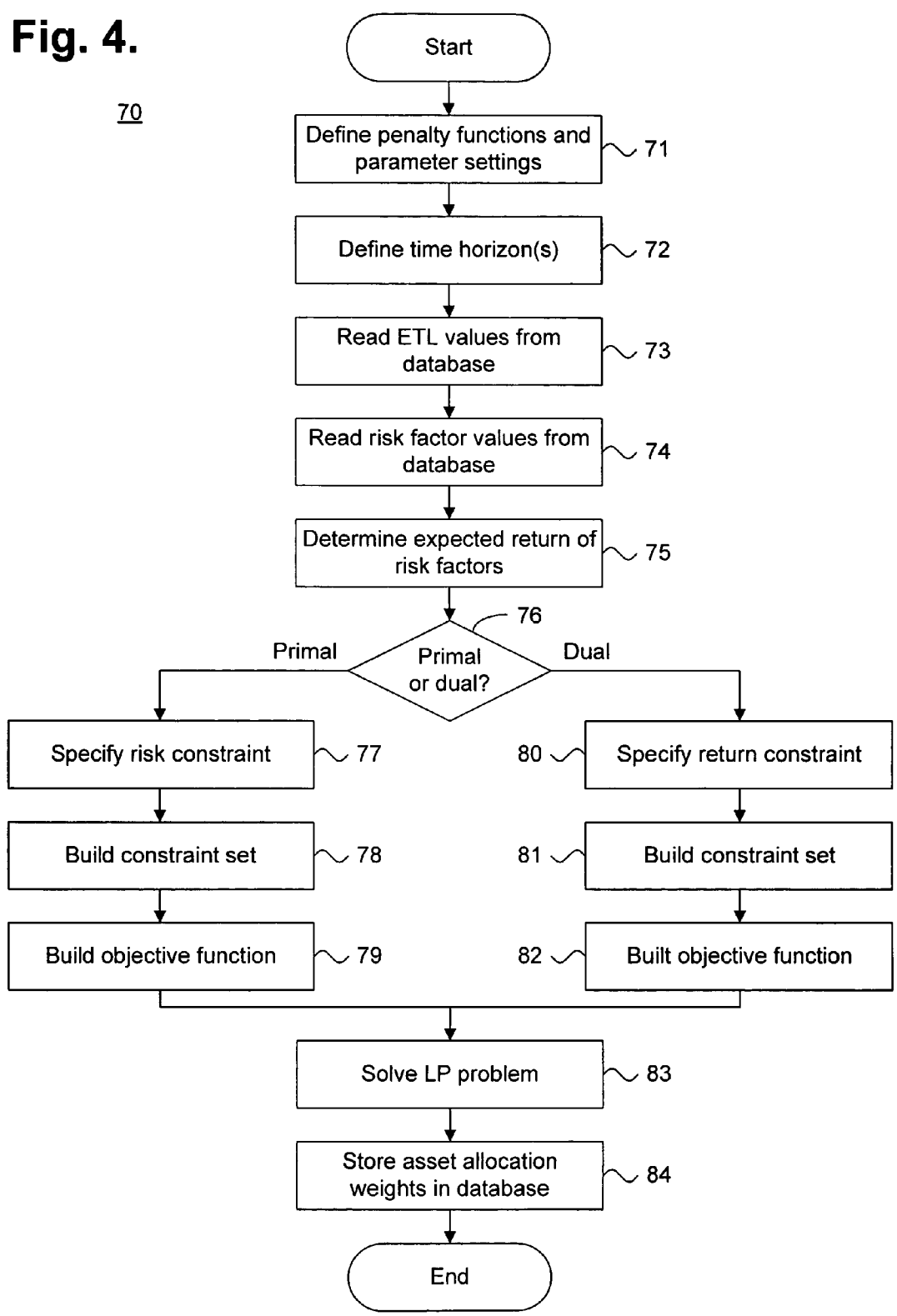
FIG. 4 is a flow diagram showing a method for determining optimal portfolio weights.

FIG. 4 is a flow diagram showing a method 70 for determining optimal portfolio weights. The method can be applied over several time horizons for the same portfolio 20 or for several levels of a hierarchical portfolio. The method 70 is described as a sequence of process operations or steps, which can be executed, for instance, by the portfolio optimizer 19.

Initially, any penalty functions and associated parameters are defined (block 171), which can be used to model, for instance, transaction costs, liquidity risk and other market friction effects. One or more time horizons for the portfolio optimization determinations are defined (block 172) and the ETLs 31 for the risk factors 28 for each time horizon are read from the database 27 (block 173). The values of the returns of the risk factors 28 are also read from the database 27 (block 174) and The expected returns for the risk factors 28 are determined (block 175).

The LP problem can be formulated for either a primal or dual formulation (block 176). If a primal formulation is used, the risk constraint is specified (block 177) and a constraint set and an objective function, including any penalty terms, are respectively built (blocks 178 and 179). Common penalty terms include those for transaction costs and market liquidity or market friction. Other types of penalty terms are possible. For a dual formulation, a return constraint is specified (block 180) and a constraint set and an objective function, including any penalty terms, are respectively built (blocks 181 and 182). Common penalty terms include those for transaction costs and market liquidity or market friction. Other types of penalty terms are possible. Finally, the resulting LP problem is solved (block 183) and the resulting optimal asset allocation weights 32 for the portfolio 27 are stored in the database 27 (block 184). The method then terminates.

The portfolio optimizer 19 computes a set of asset allocation weights from a linear function x, given the set of admissible, feasible portfolio strategies X. To restate the primal and dual formulations as LP problems, the convex risk function $ETL(x,\epsilon)$ is linearized. In one embodiment, a linearization strategy is used, such as described in Rockafellar, R. T. et al., "Optimization of Conditional Value-at-Risk," *Jour. of Risk*, Vol. 2, No. 3, pp. 21-41 (2000), the disclosure of which is incorporated by reference.

In one embodiment, the following function is suitable for linearizing $ETL(x,\epsilon)$:

$$F(x, \zeta) = \zeta + \frac{1}{\epsilon} \int_{VaR(x,\epsilon)}^{\infty} [-z^T x + V_0 - \zeta]^+ f_q(z) dz$$

where $\zeta$ is a real number, that is, $\zeta \in \Re$, and $[h]^+ = \max(h,0)$. The following relation holds:

$$ETL(x, \epsilon) = \min_{\zeta \in \Re} F(x, \zeta)$$

The primal and dual formulations can both be equivalently restated in terms of the auxiliary function $F(x,\zeta)$:

Primal:

$$\min_{(x,\zeta) \in X \otimes \Re} \rightarrow \left( \sum_{i=1}^{n} x_i Eq_i - V_0 \right)$$

such that $F(X,\zeta) \leq R$.

Dual:

$$\min_{(x,\zeta) \in X \otimes \Re} \rightarrow F(x, \zeta) \text{ such that } \left( \sum_{i=1}^{n} x_i Eq_i - V_0 \right) \geq \rho.$$

In one embodiment, the auxiliary function, $F(x,\zeta)$, is linearized through a Monte Carlo approximation. First, a parametric multivariate probability model is fit or calibrated using historical data of the random vector $q=(q_1, q_2, \ldots, q_n)$. Then, the fitted distribution is sampled to generate future scenarios $q^j=(q_1^j, q_2^j, \ldots, q_n^j), j=1,2, \ldots, N$ and to approximate $F(x,\zeta)$:

$$\tilde{F}(x, \zeta) = \zeta + \frac{1}{\epsilon N} \sum_{j=1}^{N} \left[ -(q^j)^T x + V_0 - \zeta \right]^+$$

where $q^j$ is the j-th scenario of portfolio items log-prices, and is generated using a subordinated model for the distribution to account for leptokurtic and skewness effects. The function $\tilde{F}(x,\zeta)$ is piecewise linear and convex.

Plugging the approximation into the primal formulation produces the constraint $\tilde{F}(x,\zeta) \leq R$, which can be replaced by a system of linear constraints:

$$\zeta + \frac{1}{\epsilon N} \sum_{j=1}^{N} z_j \leq R$$

$$z_j \geq -(q^j)^T x + V_0 - \zeta$$

where $j=1,2, \ldots, N$, and $z_j \geq 0$, where $j=1,2, \ldots, N$.

Finally, the primal formulation becomes:

$$\min_{(x,\zeta,z) \in X \otimes \Re \otimes \Re^2} \rightarrow -\left( \sum_{i=1}^{n} x_i Eq_i - V_0 \right)$$

$$\text{such that } \zeta + \frac{1}{\epsilon N} \sum_{j=1}^{N} z_j \leq R, z_j \geq -(q^j)^T x + V_0 - \zeta,$$

where $j = 1, 2, \ldots, N$, and $z_j \geq 0$, where $j = 1, 2, \ldots, N$.

And the dual formulation becomes:

$$\min_{(x,\zeta,z) \in X \otimes \Re \otimes \Re^2} \rightarrow -\zeta + \frac{1}{\epsilon N} \sum_{j=1}^{N} z_j$$

$$\text{such that } \sum_{i=1}^{n} x_i Eq_i - V_0 \geq \rho, z_j \geq -(q^j)^T x + V_0 - \zeta,$$

where $j = 1, 2, \ldots, N$, and $z_j \geq 0$, where $j = 1, 2, \ldots, N$.

In both the primal and dual formulations, the size of the LP problem depends heavily on the constraints used to generate the admissible set of strategies X. Nevertheless, the resulting LP problem has at least N+n+1 variables and N+1 constraints, where N is the number of scenarios generated and n stands for the number of portfolio items.

Determination of Risk Adjusted Return

Figure 5:
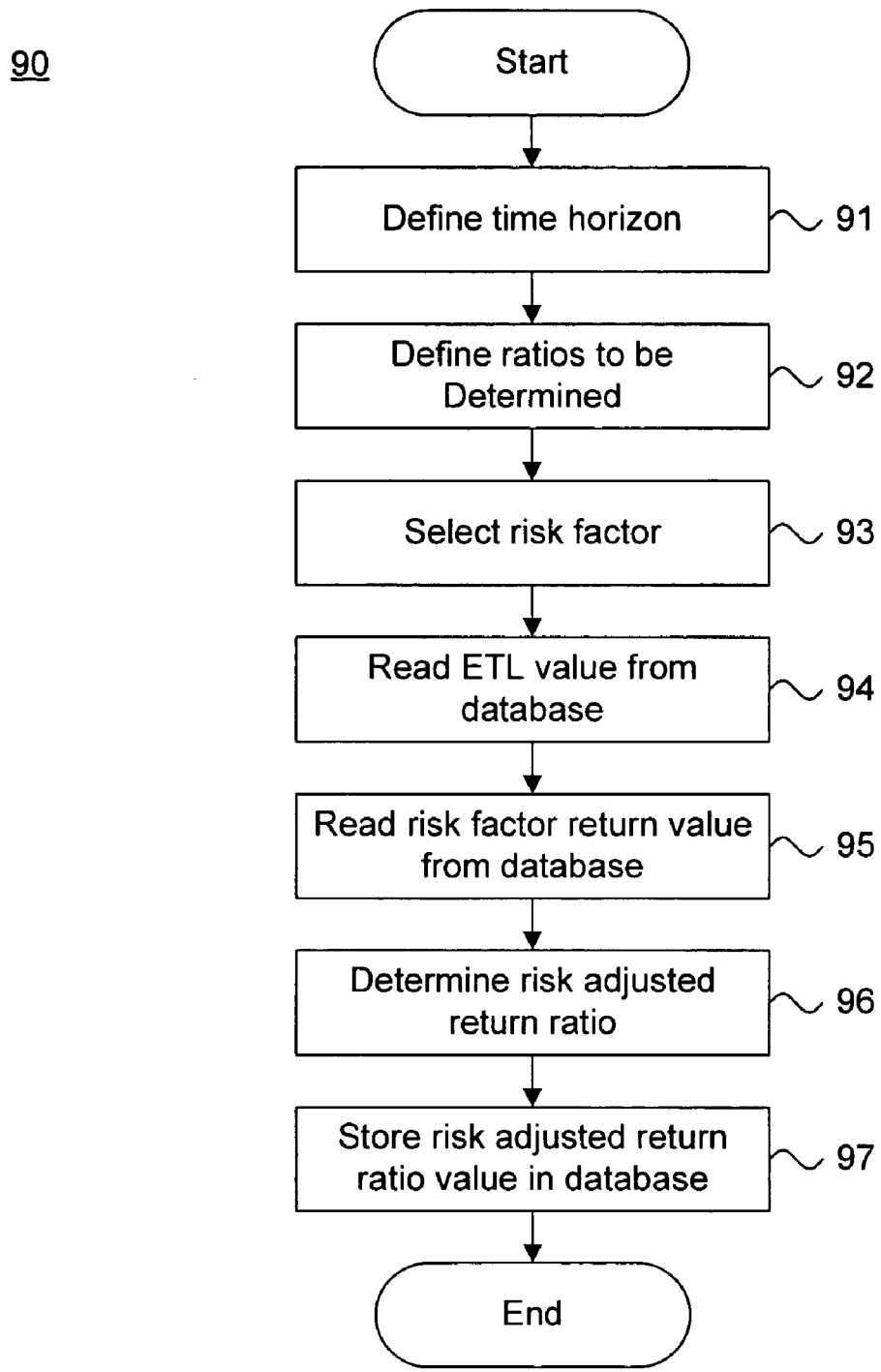
FIG. 5 is a flow diagram showing a method for determining risk adjusted return measures.

FIG. 5 is a flow diagram showing a method for 90 determining risk adjusted return 33 measures. The method can be used to determine the risk adjusted return 33 of a single risk factor 28 for one or more financial assets 26, portfolios 20 or subportfolios, or for multiple risk factors 28 for one or more financial assets 26, portfolios 20 or subportfolios. The method 90 is described as a sequence of process operations or steps, which can be executed, for instance, by the portfolio optimizer 19.

Initially, the time horizon and one or more ratios for the risk adjusted return determination are respectively defined (blocks 191 and 192). The risk factor 28 for which the ratio is to be determined is selected (block 193). Next, the ETLs 31 for the risk factors 28 for the selected time horizons and the return for the risk factor 28 are respectively read from the database 27 (blocks 194 and 195). Finally, the values for the one or more selected risk adjusted return 33 ratios are determined (block 196) and stored in the database 27 (block 197). The method then terminates.

STARR

In one embodiment, the Stable Tail Adjusted Risk Ratio (STARR) is used as a measure of risk adjusted return 33. STARR can be expressed as:

$$\rho(r) = \frac{E(r - r_f)}{c * ETL_{\epsilon\%}(r - r_f)}$$

where r is the return of the asset or portfolio, $r_f$ is the risk free return, $E(r-r_\zeta)$ is the average return or expected return, $ETL_{\epsilon\%}(r-r_\zeta)$ is the ETL at the $\epsilon\%$ quantile, and c is an optional constant used to normalize the ratio so that the ratio is equal to the Sharpe ratio if the returns were normally distributed.

Risk Adjusted Up-Side Ratio

In a further embodiment, a measure of up-side probability of gain above some quantile is used as a measure of risk adjusted return 33. This risk-adjusted up-side ratio can be expressed as:

$$\rho(r) = \frac{ETG_{\alpha\%}(x'(r - r_f))}{ETL_{\beta\%}(x'(r - r_f))}$$

where r is the return of the asset or portfolio, $r_f$ is the risk free return, $ETG_{\alpha\%}(r-r_\zeta)$ is the probability of gain at the $\alpha\%$ quantile, that is, expected tail gain (ETG), which is the analogue of ETL for gain, and $ETL_{\beta\%}(r-r_\zeta)$ is the ETL at the $\beta\%$ quantile.

Generalized Risk Adjusted Up-Side Ratio

In a further embodiment, the risk adjusted up-side ratio is generated as follows:

$$\rho(r) = \frac{ETG_{(\delta,\alpha\%)}(x'(r_f - r))}{ETL_{(\gamma,\beta\%)}(x'(r - r_f))}$$

where $ETG_{(\gamma,\alpha\%)}(r)=E(\max(L,0)\gamma/L>VaR_{\alpha\%})$, $ETL_{(\gamma,\alpha\%)}(r)=E(\max(L,0)\gamma/L>VaR_{\alpha\%})$, r is the return of the financial asset 26 or portfolio 20, $r_f$ is the risk free return, ETG is the expected trail gain, G is the gain above the $\alpha$ quantile, ETL is the expected tail loss L is the loss below the $\beta$ quantile, VaR is the value at risk for the quantile, which is the analogue for gain, and $\delta$ and $\gamma$ are constants.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for providing optimization of a financial portfolio using a parametric leptokurtic distribution, comprising:

a memory containing a database configured to store a time series comprising a plurality of risk factors applicable over at least one time horizon, a portfolio comprising a plurality of financial assets, a quantile, and one or more risk adjusted return points for the financial assets;

an input device to receive input from a user;

a network operatively coupled and providing communication between the memory, the input device, an output device, and a processor; where the processor is programmed to execute program modules, the program modules comprising:

an association module configured to associate the financial assets with the risk factors;

a risk determining module configured to generate a subordinated parametric distribution model exhibiting leptokurtic behavior;

an expected tail loss determining module configured to express a function of expected tail loss for the quantile based on the parametric distribution model exhibiting leptokurtic behavior, wherein the expected tail loss, $ETL(x,\epsilon)$ is defined in accordance with the equation:

$$F(x, \zeta) = \zeta + \frac{1}{\varepsilon} \int_{VaR(x,\varepsilon)}^{\infty} [-z^T x + V_0 - \zeta]^+ f_q(z) dz,$$

where the relation holds:

$$ETL(x, \varepsilon) = \min_{\zeta \in \Re} F(x, \zeta),$$

where $\zeta$ is a real number, $VaR(x, \epsilon)$ is Value-at-Risk of a portfolio where $x=(x_1, x_2, \ldots, x_n)$ is a portfolio structure as a vector of portfolio allocation weights, $\epsilon$ is the quantile, $f_q(z)$ is the parametric distribution exhibiting leptokurtic behavior, with the density function of random vector q of future log prices of all portfolio prices one period ahead, vector z, where $z=(z\_1, \ldots, z\_n)$, is in n-dimensional Euclidean space and is over the domain of those z such that the value $-z^T x+V_0$ is larger than $VaR(x, \epsilon)$, where $z^T$ is the transposed vector of z, and $V_0$ is present portfolio log-value; and an optimal portfolio determining module configured to determine a set of portfolio asset weights for each of the financial assets based on the expected tail loss at each such time horizon and for each risk adjusted return point, wherein the output device is configured to provide optimization of the portfolio based on the portfolio asset weights for each risk adjusted return point for the portfolio.

2. A system according to claim 1, wherein the subordinated parametric distribution model is selected from the group comprising an alpha-Stable distribution, T-distribution, sub-Gaussian Stable distribution, and mixture of multivariate Normal distributions.

3. A system according to claim 1, wherein the subordinated parametric distribution model further has an asymmetric behavior.

4. A system according to claim 1, further comprising:
a clustering of volatility function, wherein the portfolio optimizer is configured to apply the clustering of volatility function along a time series of returns of the risk factors.

5. A system according to claim 4, wherein the clustering of volatility function is selected from the group comprising a multivariate ARMA-GARCH, comprising an exponential weighted moving average algorithm, applied to a time series of risk factor returns and producing innovations having leptokurtotic distributions.

6. A system according to claim 1, wherein the risk factors are selected from the group comprising market price returns, derived values and exogenous factors.

7. A system according to claim 1, wherein the portfolio optimizer applies a linear programming method using a primal-dual formulation.

8. A system according to claim 1, wherein a plurality of time horizons are specified.

9. A system according to claim 1, wherein the portfolio is structured into a hierarchy of subportfolios.

10. A system according to claim 1, wherein estimates of returns are adjusted for returns of a risk free asset or a benchmark portfolio.

11. A system according to claim 1, wherein a penalty function is used to adjust returns or comprises a constraint.

12. A computer-implemented method for providing optimization of a financial portfolio using a parametric leptokurtic distribution, the computer-implemented method comprising the steps of:
storing a time series comprising a plurality of risk factors applicable over at least one time horizon, a portfolio comprising a plurality of financial assets, a quantile, and one or more risk adjusted return points for the financial assets in a database contained in a memory;
maintaining a network operatively coupled and providing communication between the memory, an input device, an output device, and a processor, wherein the processor is configured to execute computer executable code stored in program modules, comprising:
associating the financial assets with the risk factors;
generating a subordinated parametric distribution model exhibiting leptokurtic behavior;
expressing a function of expected tail loss for the quantile based on the subordinated parametric distribution model exhibiting leptokurtic behavior, wherein the expected tail loss, ETL(x, $\epsilon$), is defined in accordance with the equation:

$$F(x, \zeta) = \zeta + \frac{1}{\epsilon} \int_{VaR(x,\epsilon)}^{\infty} [-z^T x + V_0 - \zeta]^+ f_q(z) dz,$$

$$ETL(x, \epsilon) = \min_{\zeta \in \Re} F(x, \zeta),$$

where $\zeta$ is a real number, VaR(x, $\epsilon$) is a Value-at-Risk of a portfolio where $x=(x_1, x_2, \ldots, x_n)$ is a portfolio structure as a vector of portfolio allocation weights, $\epsilon$ is the quantile, $f_q(z)$ is the parametric distribution exhibiting leptokurtic behavior, with the density function of random vector q of future log prices of all portfolio prices one period ahead, vector z, where $z=(z\_1,\ldots,z\_n)$, is in n-dimensional Euclidean space and is over the domain of those z such that the value $-z^T x + V_0$ is larger than VaR(x, $\epsilon$), where $Z^T$ is the transposed vector of z, and $V_0$ is present portfolio log-value.

determining a set of optimal portfolio weights for each of the financial assets based on the expected tail loss at each such time horizon and for each risk adjusted return point; and providing optimization of the portfolio based on the portfolio weights for each risk adjusted return point for the portfolio via the output device.

13. A method according to claim 12, wherein the subordinated parametric distribution model is selected from the group comprising an alpha-Stable distribution, T-distribution, sub-Gaussian Stable distribution, and mixture of multivariate Normal distributions.

14. A method according to claim 12, wherein the subordinated parametric distribution model further has an asymmetric behavior.

15. A method according to claim 12, further comprising:
specifying a clustering of volatility function; and
applying the clustering of volatility function along a time series of returns of the risk factors.

16. A method according to claim 15, wherein the clustering of volatility function is selected from the group comprising a multivariate ARMA-GARCH, comprising an exponential weighted moving average algorithm, applied to a time series of risk factor returns and producing innovations having leptokurtotic distributions.

17. A method according to claim 12, wherein the risk factors are selected from the group comprising market price returns, derived values and exogenous factors.

18. A method according to claim 12, further comprising:
applying a linear programming method using a primal-dual formulation.

19. A method according to claim 12, wherein a plurality of time horizons are specified.

20. A method according to claim 12, further comprising:
structuring the portfolio into a hierarchy of subportfolios.

21. A method according to claim 12, wherein estimates of returns are adjusted for returns of a risk free asset or a benchmark portfolio.

22. A method according to claim 12, wherein a penalty function is used to adjust returns or comprises a constraint.

\* \* \* \* \*